(12) United States Patent
Pope et al.

(10) Patent No.: US 9,077,751 B2
(45) Date of Patent: Jul. 7, 2015

(54) DRIVER LEVEL SEGMENTATION

(75) Inventors: Steven L. Pope, Costa Mesa, CA (US); David J. Riddoch, Huntingdon (GB)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 1203 days.

(21) Appl. No.: 12/513,132

(22) PCT Filed: Oct. 18, 2007

(86) PCT No.: PCT/GB2007/003994
§ 371 (c)(1),
(2), (4) Date: Dec. 15, 2009

(87) PCT Pub. No.: WO2008/053153
PCT Pub. Date: May 8, 2008

(65) Prior Publication Data
US 2010/0135324 A1    Jun. 3, 2010

(30) Foreign Application Priority Data
Nov. 1, 2006   (GB) .................................. 0621774.9

(51) Int. Cl.
*H04L 29/06* (2006.01)

(52) U.S. Cl.
CPC .............. *H04L 69/16* (2013.01); *H04L 69/166* (2013.01); *H04L 69/22* (2013.01); *H04L 69/161* (2013.01)

(58) Field of Classification Search
CPC ....... H04L 69/16; H04L 69/161; H04L 69/22; H04L 69/166
See application file for complete search history.

(56) References Cited

U.S. PATENT DOCUMENTS

| 5,272,599 A | 12/1993 | Koenen |
| 5,325,532 A | 6/1994 | Crosswy et al. |

(Continued)

FOREIGN PATENT DOCUMENTS

| EP | 620521 A2 | 10/1994 |
| EP | 1359724 A1 | 11/2003 |

(Continued)

OTHER PUBLICATIONS

C. A. Thekkath, et al.; ACM Computer Communication Review, vol. 23, No. 4, Oct. 1993.

(Continued)

*Primary Examiner* — Jae Y Lee
(74) *Attorney, Agent, or Firm* — Haynes Beffel & Wolfeld LLP; Warren S. Wolfeld

(57) ABSTRACT

A method for performing segmentation of a first data packet into a plurality of second data packets at a functionality of a device driver for a network interface device supported by a data processing system, each second data packet comprising a header and a segment of data from the first data packet and the network interface device being capable of supporting a communication link over a network with another network interface device, the method comprising: accepting the first data packet, the first data packet carrying data for transmission by the network interface device over the network; forming a set of headers for the plurality of second data packets; writing the set of headers to memory; forming a specification, the specification indicating the headers in memory and the segments of data in the first data packet; requesting by means of the device driver transmission by the network interface device of the headers and the respective segments of data indicated in the specification so as to effect transmission of the second data packets over the network.

22 Claims, 3 Drawing Sheets

(56) References Cited

U.S. PATENT DOCUMENTS

| | | |
|---|---|---|
| 5,946,189 A | 8/1999 | Koenen et al. |
| 6,098,112 A | 8/2000 | Ishijima et al. |
| 6,160,554 A | 12/2000 | Krause |
| 6,304,945 B1 | 10/2001 | Koenen |
| 6,349,035 B1 | 2/2002 | Koenen |
| 6,434,620 B1 | 8/2002 | Boucher et al. |
| 6,438,130 B1 | 8/2002 | Kagan et al. |
| 6,502,203 B2 | 12/2002 | Barron et al. |
| 6,530,007 B2 | 3/2003 | Olarig et al. |
| 6,564,267 B1 | 5/2003 | Lindsay |
| 6,667,918 B2 | 12/2003 | Leader et al. |
| 6,708,233 B1 | 3/2004 | Fuller et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,788,704 B1 | 9/2004 | Lindsay |
| 6,904,534 B2 | 6/2005 | Koenen |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2003/0007165 A1 | 1/2003 | Hudson |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2003/0231657 A1 | 12/2003 | Poon et al. |
| 2004/0042483 A1* | 3/2004 | Elzur et al. .................. 370/463 |
| 2004/0062275 A1 | 4/2004 | Siddabathuni |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0249998 A1* | 12/2004 | Rajagopalan et al. ......... 710/30 |
| 2004/0252685 A1 | 12/2004 | Kagan et al. |
| 2004/0258075 A1 | 12/2004 | Sidenblad et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0147126 A1* | 7/2005 | Qiu et al. ..................... 370/474 |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2005/0281287 A1* | 12/2005 | Niinomi et al. ............... 370/474 |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0193318 A1 | 8/2006 | Narasimhan et al. |
| 2006/0209718 A1 | 9/2006 | Kinsey et al. |
| 2006/0215691 A1 | 9/2006 | Kobayashi et al. |
| 2006/0228637 A1 | 10/2006 | Jackson et al. |
| 2006/0248191 A1 | 11/2006 | Hudson et al. |
| 2007/0002761 A1* | 1/2007 | Diamant et al. ............... 370/252 |
| 2007/0025395 A1* | 2/2007 | Cardona et al. ............... 370/474 |
| 2007/0188351 A1 | 8/2007 | Brown et al. |
| 2007/0220183 A1 | 9/2007 | Kagan et al. |
| 2007/0223483 A1* | 9/2007 | Huang et al. ................. 370/394 |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |

(56) References Cited

U.S. PATENT DOCUMENTS

| | | |
|---|---|---|
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | | |
|---|---|---|---|
| WO | 9922306 | A1 | 5/1999 |
| WO | 9964952 | A1 | 12/1999 |
| WO | 2001048972 | A1 | 7/2001 |
| WO | 2002035838 | A1 | 5/2002 |
| WO | 2008127672 | A2 | 10/2008 |
| WO | 2009136933 | A1 | 11/2009 |
| WO | 20090134219 | A1 | 11/2009 |
| WO | 2010020907 | A2 | 2/2010 |
| WO | 2010087826 | A1 | 8/2010 |
| WO | 2011043769 | A1 | 4/2011 |
| WO | 2011053305 | A1 | 5/2011 |
| WO | 2011053330 | A1 | 5/2011 |

OTHER PUBLICATIONS

Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 94.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, May 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.
P. Druschel, et al.; ACM Computer Communication Review, vol. 24, No. 4, Oct. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; Gigabit Networking Workshop '97 Meeting, Kobe, Japan, Apr. 1997.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.
M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Bilic Hrvoye, et al.; Proceedings of the 9th Symposium on High Performance Interconnects, pp. 81, Aug. 22, 2001.
Gordon E. Moore; Electronics, vol. 38, No. 8, pp. 114-117, Apr. 19, 1965.
Jack B. Dennis and Earl C. Van Horn; Communications of the ACM, vol. 9, No. 3, pp. 143-155, Mar. 1966.
Marvin Zelkowitz; Communications of the ACM, vol. 14, No. 6, p. 417-418, Jun. 1971.
J. Carver Hill; Communications of the ACM, vol. 16, No. 6, p. 350-351, Jun. 1973.
F.F. Kuo; ACM Computer Communication Review, vol. 4 No. 1, Jan. 1974.
Vinton Cerf, Robert Kahn; IEEE Transactions on Communications, vol. COM-22, No. 5, pp. 637-648, May 1974.
V. Cerf, et al.; ACM Computer Communication Review, vol. 6 No. 1, p. 1-18, Jan. 1976.
Robert M. Metcalfe and David R. Boggs; Communications of the ACM, vol. 19, Issue 7, pp. 395-404, Jul. 1976.
P. Kermani and L. Kleinrock; Computer Networks, vol. 3, No. 4, pp. 267-286, Sep. 1979.

(56) References Cited

OTHER PUBLICATIONS

John M. McQuillan, et al.; Proceedings of the 6th Data Communications Symposium, p. 63, Nov. 1979.
Andrew D. Birrell, et al.; Communications of the ACM, vol. 25, Issue 4, pp. 260-274, Apr. 1982.
Ian M. Leslie, et al.; ACM Computer Communication Review, vol. 14, No. 2, pp. 2-9, Jun. 1984.
John Nagle; ACM Computer Communication Review, vol. 14, No. 4, p. 11-17, Oct. 1984.
Robert M. Brandriff, et al.; ACM Computer Communication Review, vol. 15, No. 4, Sep. 1985.
C. Kline; ACM Computer Communication Review, vol. 17, No. 5, Aug. 1987.
Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, 1988, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, 1988, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, Apr. 1989.
R. Braden, et al.; ACM Computer Communication Review, vol. 19, No. 2, p. 86-94, Apr. 1989.
David D. Clark, et al.; IEEE Communications Magazine, vol. 27, No. 6, pp. 23-29, Jun. 1989.
David R. Cheriton; ACM Computer Communication Review, vol. 19, No. 4, p. 158-169, Sep. 1989.
Derek Robert McAuley; PhD Thesis, University of Cambridge, Sep. 1989.
Craig Partridge; ACM Computer Communication Review, vol. 20, No. 1, p. 44-53, Jan. 1990.
D. D. Clark and D. L. Tennenhouse; ACM Computer Communication Review, vol. 20, No. 4, pp. 200-208, 1990, Sep. 1990.
Eric C. Cooper, et al.; ACM Computer Communication Review, vol. 20, No. 4, p. 135-144, Sep. 1990.
Bruce S. Davie; ACM Computer Communication Review, vol. 21, No. 4, Sep. 1991.
C. Brendan S. Traw, et al.; ACM Computer Communication Review, vol. 21, No. 4, p. 317-325, Sep. 1991.
Ian Leslie and Derek R. McAuley; ACM Computer Communication Review, vol. 21, No. 4, p. 327, Sep. 1991.
Mark Hayter, Derek McAuley; ACM Operating Systems Review, vol. 25, Issue 4, p. 14-21, Oct. 1991.
Gregory G. Finn; ACM Computer Communication Review, vol. 21, No. 5, p. 18-29, Oct. 1991.
Greg Chesson; Proceedings of the Third International Conference on High Speed Networking, Nov. 1991.
Michael J. Dixon; University of Cambridge Computer Laboratory Technical Report No. 245, Jan. 1992.
Danny Cohen, Gregory Finn, Robert Felderman, Annette DeSchon; Made available by authors, Jan. 10, 1992.
Gene Tsudik; ACM Computer Communication Review, vol. 22, No. 5, pp. 29-38, Oct. 1992.
Peter Steenkiste; ACM Computer Communication Review, vol. 22, No. 4, Oct. 1992.
Paul E. McKenney and Ken F. Dove; ACM Computer Communication Review, vol. 22, No. 4, Oct. 1992.
Erich Ruetsche and Matthias Kaiserswerth; Proceedings of the IFIP TC6/WG6.4 Fourth International Conference on High Performance Networking IV, Dec. 14, 1992.
C. Traw and J. Smith; IEEE Journal on Selected Areas in Communications, pp. 240-253, Feb. 1993.
E. Ruetsche; ACM Computer Communication Review, vol. 23, No. 3, Jul. 1993.
Jonathan M. Smith and C. Brendan S. Traw; IEEE Network, vol. 7, Issue 4, pp. 44-52, Jul. 1993.
Jeffrey R. Michel; MSci Thesis, University of Virginia, Aug. 1993.
Mark David Hayter; PhD Thesis, University of Cambridge, Sep. 1993.
Jonathan Kay and Joseph Pasquale; ACM Computer Communication Review, vol. 23, No. 4, pp. 259-268, Oct. 1993.
W. E. Leland, et al.; ACM Computer Communication Review, vol. 23, No. 4, p. 85-95, Oct. 1993.
Bilic Hrvoye, et al.; 9th Symposium on High Performance Interconnects, Aug. 22, 2001.
Bruce Lowekamp, et al.; ACM Computer Communication Review, vol. 31, No. 4, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, Jan. 2002.
Murali Rangarajan, et al.; Technical Report DCR-TR-481, Computer Science Department, Rutgers University, Mar. 2002.
Jon Crowcroft, Derek McAuley; ACM Computer Communication Review, vol. 32, No. 5, Nov. 2002.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, Apr. 2003.
Tom Kelly; ACM Computer Communication Review, vol. 33, No. 2, pp. 83-91, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, 2004, May 1, 2004.
Greg Regnier, et al.; Computer, IEEE Computer Society, vol. 37, No. 11, pp. 48-58, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.

(56) References Cited

OTHER PUBLICATIONS

P. Balaji, et al.; Proceedings of the IEEE International Conference on Cluster Computing, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
H. K. Jerry Chu; Proceedings of the USENIX Annual Technical Conference, Jan. 1996.
Ken Calvert; ACM Computer Communication Review, vol. 36, No. 2, pp. 27-30, Apr. 2006.
Jon Crowcroft; ACM Computer Communication Review, vol. 36, No. 2, pp. 51-52, Apr. 2006.
Greg Minshall, et al.; ACM Computer Communication Review, vol. 36, No. 3, pp. 79-92, Jul. 2006.
David Wetherall; ACM Computer Communication Review, vol. 36, No. 3, pp. 77-78, Jul. 2006.
Patrick Geoffray; HPCWire article: http://www.hpcwire.com/features/17886984.html, Aug. 18, 2006.
Various; 14th Symposium on High Performance Interconnects, Aug. 23, 2006.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 89-92, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
J. Evans and T. Buller; IEEE TCGN Gigabit Networking Workshop, Apr. 22, 2001.
M.V. Wilkes and R.M. Needham; ACM SIGOPS Operating Systems Review, vol. 14, Issue 1, pp. 21-29, Jan. 1980.
Xu, Herbert, "GSO: Generic Segmentation Offload," http://lwn/net/articles, Jun. 20, 2006, 2pp.
International Search Report for PCT/GB2007/003994 mailed Feb. 10, 2008.
Joe Touch, et al.; "Host-based Routing Using Peer DMA," Gigabit Networking Workshop '97 Meeting, Kobe, Japan, Apr. 1997, 2pp.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.

\* cited by examiner

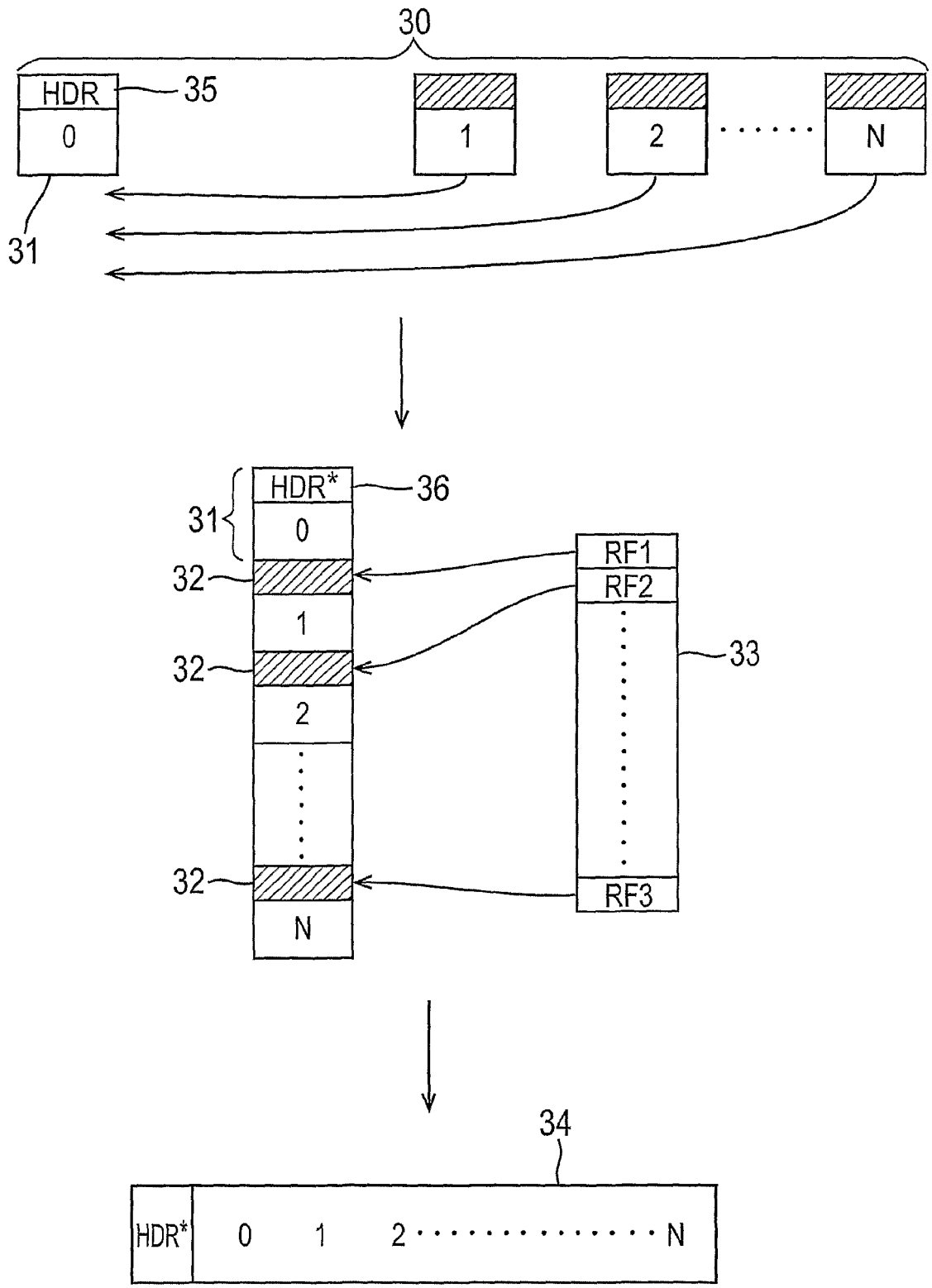

DRIVER LEVEL SEGMENTATION

BACKGROUND OF THE INVENTION

This invention relates to packet segmentation and reassembly at a driver-level functionality associated with a network interface device.

One of the functions of a transport protocol is the reassembly of received segments of data from the underlying network layers and the segmentation of data received from upper layers of the protocol stack into units of data which are suitable for transmission by the underlying network.

The CPU overhead of both of these operations has long been understood to be costly. Recently network interface hardware (such as that manufactured by Neterion Inc.) has been introduced which is capable of performing these operations on behalf of the host CPU and in accordance with the Microsoft Windows network task offload architecture. The HP Whitepaper, "TCP Segmentation Offload (TSO) Performance on HP rp4440 Servers", dated August 2004 investigates the improvement in performance available when a TSO implementation is used, as compared with a conventional non-offloaded segmentation architecture.

However, another approach supposes that the real cost in CPU overhead is not the segmentation or reassembly operations themselves, but the repeated traversal of a complex multi-layered software protocol stack. Rather than introducing complex hardware to perform segmentation and reassembly, it would therefore be desirable to perform both these functions in software outside the protocol stack so as to reduce the number of traversals of the protocol stack both on transmission and reception and hence the per-packet overhead of protocol processing.

Recently the utility of this approach has been recognised by the maintainers of the Linux kernel and a generic transmit segmentation offload module has been implemented which performs this function at the lowest layer of the generic kernel network stack. This development is detailed in the article "Linux Generic Segmentation Offload" available at http://lwn.net/Articles/189970 and dated June 2006.

SUMMARY OF THE INVENTION

According to a first aspect of the present invention there is provided a method for performing segmentation of a first data packet into a plurality of second data packets at a functionality of a device driver for a network interface device supported by a data processing system, each second data packet comprising a header and a segment of data from the first data packet and the network interface device being capable of supporting a communication link over a network with another network interface device, the method comprising: accepting the first data packet, the first data packet carrying data for transmission by the network interface device over the network; forming a set of headers for the plurality of second data packets; writing the set of headers to memory; forming a specification, the specification indicating the headers in memory and the segments of data in the first data packet; and requesting by means of the device driver transmission by the network interface device of the headers and the respective segments of data indicated in the specification so as to effect transmission of the second data packets over the network.

Preferably the device driver is operable to indicate to the data processing system that the network interface device is capable of performing transmit segmentation. Suitably the network interface is not capable of performing transmit segmentation.

Preferably the device driver is operable to indicate to the data processing system that the network interface device is capable of performing a checksum calculation on each segment of data.

Preferably TCP flow control is performed at a network protocol stack of the data processing system.

Preferably the size of the first data packet is greater than the maximum packet size allowed by the network segment to which the data processing system is connected.

Preferably the maximum size of the second packets is indicated to the device driver by the data processing system. The maximum size of the second packets may be indicated to the device driver in a header of the first data packet. Preferably the size of each of the plurality of second data packets is not greater than the maximum packet size allowed by the network segment to which the data processing system is connected. Further preferably, the size of each of the plurality of second data packets is not greater than the maximum packet size allowed over the connection over which those packets are to be sent.

Suitably the network interface card is compatible with Ethernet. Suitably the network protocol is TCP/IP.

The set of headers may be written to a first area of the memory. The step of accepting the first data packet may include the step of receiving the first data packet at a second area of the memory. Preferably the first area of the memory is allocated to the device driver. Preferably the second area of the memory is allocated to the device driver.

The first data packet may be received in fragments and the fragments enqueued at the second area of the memory. Segmentation of the first data packet may start before all the fragments of the first data packet have been received.

Preferably the step of requesting transmission of the headers and the respective segments of data indicated in the specification is by means of a single request to the network interface device.

Preferably the network interface device is operable to access the first and second areas of the memory by Direct Memory Access.

Preferably the header of the first data packet includes a first identifier and all the headers of the second data packets include the first identifier.

Preferably the step of forming a set of headers for the plurality of second data packets includes the step of calculating an offset for each header in the set, the offset of a header being the position in bytes of its respective segment of data in the first data packet. Suitably the step of forming a set of headers for the plurality of second data packets includes the step of calculating a checksum for each header in the set, the checksum of a header being calculated using its respective segment of data.

According to a second aspect of the present invention there is provided a method for transmitting data by means of a data processing system, the system being capable of supporting an operating system and at least one application and having access to a memory and a network interface device capable of supporting a communication link over a network with another network interface device, the method comprising the steps of: an application having data for transmission requesting a functionality of the operating system to send the data to be transmitted; responsive to that request: forming the data into at least one first data packet at a network protocol stack of the system; sending an indication to a device driver of the network interface device that the at least one first data packet is to be transmitted over the network; and subsequently: performing segmentation of each first data packet into a plurality of second data packets at a functionality of the device driver, each second data packet comprising a header and a segment of data; the segmentation step including: forming a set of headers for the plurality of second data packets; writing the set of headers to memory; and forming a specification, the specification indicating the headers in memory and the segments of data in the first data packet; requesting by means of the device driver transmission by the network interface device of the headers and the respective segments of data indicated in the specification so as to effect transmission of the second data packets over the network.

Preferably the device driver is operable to indicate to the operating system or network protocol stack that the network interface device is capable of performing transmit segmentation. The network interface may not be capable of performing transmit segmentation.

Preferably the size of the first data packet is greater than the maximum packet size allowed by the network segment to which the data processing system is connected.

Preferably the maximum size of the second packets is indicated to the device driver by the operating system. Preferably the maximum size of the second packets is indicated to the device driver in a header of the first data packet. Preferably the size of each of the plurality of second data packets is not greater than the maximum packet size allowed by the network segment to which the data processing system is connected. Further preferably the size of each of the plurality of second data packets is not greater than the maximum packet size allowed over the connection over which those packets are to be sent.

Suitably the operating system is Microsoft Windows.

According to a third aspect of the present invention there is provided a method for performing reassembly of data packets at a functionality of a device driver for a network interface device supported by a data processing system, each data packet comprising a header and a segment of data and being received by the network interface device over a communication link with another network interface device, the method comprising: accepting data packets from the network interface device at the functionality of the device driver; enqueueing each data packet of a first set of the data packets at a first queue in memory, the first queue comprising at least a first data packet; modifying the header of the first data packet in the first queue so as to include the segment of data of each newly-enqueued data packet of the first set; defining a specification, the specification indicating the segments of data of the newly-enqueued data packets of the first set in the first queue; and, in response to one or more first predetermined conditions being met: causing a superpacket comprising the header of the first data packet in the first queue and the segments of data indicated by the specification to be passed to a network protocol stack of the data processing system for subsequent protocol processing.

Preferably the step of modifying the header of the first data packet includes modifying an indication of packet size in the header of the first data packet.

Preferably the size of the superpacket is greater than the maximum packet size allowed by the network segment to which the data processing system is connected.

The first predetermined conditions may include: a) the number of data packets at the first queue is a predetermined number; b) the total size of the data packets at the first queue is a predetermined size; c) a predetermined time has elapsed since the first data packet was enqueued at the first queue.

The method may further comprise: enqueueing each data packet of a second set of the data packets at a second queue in memory, the second queue comprising at least a first data packet; modifying the header of the first data packet in the second queue so as to include the segment of data of each newly-enqueued data packet of the second set; defining a specification, the specification indicating the segments of data of the newly-enqueued data packets of the second set in the second queue; and, in response to one or more first predetermined conditions being met: causing a superpacket comprising the header of the first data packet in the second queue and the segments of data indicated by the specification to be passed to a network protocol stack of the data processing system for subsequent protocol processing.

Preferably data packets of the first set belong to a first data flow and data packets of the second set belong to a second data flow. Suitably the data packets are TCP/IP data packets and the first and second data flows are different IP data flows.

Preferably the step of accepting data packets from the network interface device includes: if at least one data packet from the network interface device belongs to a data flow for which a queue has not yet been established, defining a new queue in memory for that data flow. Preferably the subsequent steps of the method are performed as though the at least one data packet is the first set of data packets and the new queue is the first queue.

Preferably if one or more second predetermined conditions are met, the enqueueing, modifying and defining steps are replaced with the steps of: passing the data packets to the network protocol stack of the data processing system for subsequent protocol processing. The second predetermined conditions may include: a) at least some of the data packets are fragmented; b) at least some of the data packets are out of sequence; c) at least some of the data packets do not contain a segment of data; d) the data packets are TCP/IP data packets and at least some of the data packets have one of RST, SYN or URG TCP flags set.

DESCRIPTION OF THE DRAWINGS

The present invention will now be described by way of example with reference to the accompanying drawings, in which:

FIG. 3 shows a method for performing packet reassembly at a device driver in accordance with the present invention.

DETAILED DESCRIPTION OF THE DRAWINGS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
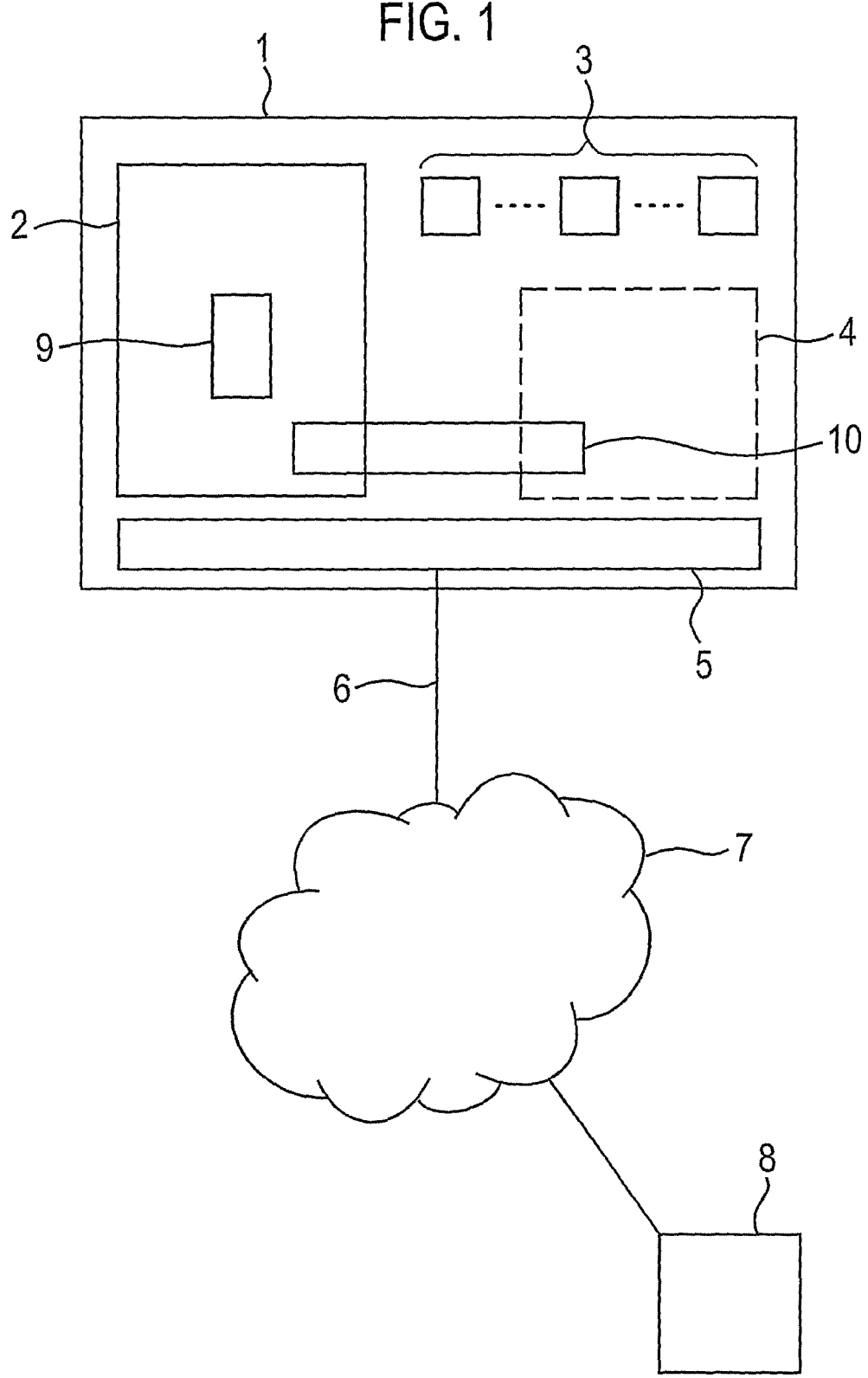
FIG. 1 shows a data processing system in accordance with the present invention.

FIG. 1 shows a data processing system 1 capable of operating in accordance with the present invention. Data processing system 1 supports an operating system 2, one or more applications 3, a memory 4, and a network interface device 5. The network interface device is operable to support a communication link 6 over a network 7 with another network interface device 8, so as to allow the communication of packetised data between the two network interface devices. Typically the operating system provides a network protocol stack 9, capable of performing protocol processing of data received from the one or more applications for transmission over the network. However, the network protocol stack may alternatively be provided by a user mode functionality or embodied in hardware.

A device driver 10 provides a software interface for the network interface device, suitably allowing functionalities of the operating system or user space processes to interact with the network interface device. This interaction may be for the purposes of receiving or transmitting data over the network, controlling the state of the network interface device, or providing state information about the network interface device, to name but a few. The device driver may include one or more driver modules (such as miniport drivers, class drivers, virtual device drivers) and functionalities. The modules and functionalities of the device driver may operate in either kernel mode or user mode, but preferably at least part of the device driver operates in kernel mode so as to provide a driver interface to the operating system.

In accordance with the present invention, the device driver includes at least one functionality operable to perform one or both of segmentation and reassembly of data packets that are to be transmitted or have been received over the network. Preferably this device driver functionality operates in kernel mode. Suitably the device driver is a device driver for an Ethernet network interface device. Suitably the device driver and network interface device are operable to handle TCP/IP traffic data.

Data processing system 1 may be any kind of system for processing data, including, but not limited to, a personal computer, a server, a switch or a router. The operating system may be any suitable software or firmware, such as Microsoft Windows or any of the Unix or Linux variants.

Memory 4 may be any kind of memory or storage device known in the art. Typically the memory will support the work space and data storage of the applications and operating system. Preferably memory resources are handled by the operating system, which may allocate portions of the memory to the applications, processes and other functionalities of the data processing system. Memory portions may be allocated exclusively to a process, application or functionality by the operating system so as to prevent other processes, applications or functionalities accessing those memory portions.

A first aspect of the present invention relates to segmentation of data packets at the device driver 10, or a functionality thereof. When an application 3 has data to transmit over the network, it typically makes a request for transmission through a functionality of the operating system. In Windows, this is usually by means of the Winsock Application Programming Interface (API). The Winsock is arranged to direct the transmission request to a network protocol stack available to the operating system by which the data should be sent. For example, data destined for a host on a local Ethernet network may be sent to a TCP/IP stack of the operating system for formation into packets and transmission over the network by the network interface device.

Packet-based transmission protocols generally require data for transmission to be segmented into many data packets whose size is determined by the properties of the physical network. Each data packet must be processed in accordance with the necessary protocols before being transmitted across the network. In the case of complex protocol stacks such as TCP/IP this introduces significant processing overheads due to: a) the traversal of data across the protocol stack—for example, in the repeated copying of data segments; and b) the control processing associated with the data traversing the stack in multiple data segments—in particular, in the processing associated with data repeatedly traversing the generic driver API, which presents an abstraction of the hardware to the protocol stack. The abstraction provided by the generic driver API is generalised so as to be capable of representing any of a large number of different hardware-specific drivers and there is therefore a high processing cost involved with invoking this API. For example, often the network hardware capabilities must be determined so as to determine which of the generic driver API operations are appropriate in a given circumstance.

The present invention reduces these processing overheads by causing the data for many packets to traverse the stack in one "superpacket" and performing segmentation of the superpacket after protocol processing by the protocol stack. Preferably such superpackets are larger than may be sent over the physical network. The superpacket will generally not be greater in size than the TCP transmit window size—the transmit window size being the amount of data which may be transmitted over a particular connection without getting an acknowledgement from the destination host at the other end of the connection. The transmit window size is typically a dynamic parameter that can rapidly change based upon calculations performed by the operating system or protocol stack.

Preferably initial protocol processing of the packet is performed by the protocol stack. This ensures that flow control of higher level protocols such as TCP remains with the protocol stack and the methods of the present invention may operate without modification to the stack. The protocol stack may not be aware that segmentation will subsequently occur at the device driver, with parameters of the protocol stack controlling segment size being modified so as to cause the stack to process "super-sized" data packets (i.e. of a size larger than the MSS for the connection).

However, preferably the protocol stack is aware that the supersize IP packets it generates are to be subsequently segmented before transmission. In which case, the device driver preferably receives an indication of the required IP segment size from the protocol stack or operating system. This may be passed down to the device driver with the superpacket—for example, as a parameter in the header of the superpacket. Preferably the indicated segment size will be the MSS for the connection.

In a preferred embodiment, the device driver is operable to indicate to the protocol stack and/or the operating system that the NIC is capable of performing transmit segmentation. The protocol stack may thus generate superpackets on the assumption that the NIC will subsequently perform segmentation of those superpackets: in fact, that segmentation will be performed by the device driver of the NIC.

The MSS is the largest data segment size that TCP will enqueue for transmission at the IP layer and is a value maintained by TCP for each end-to-end connection. Typically the MSS is not greater in size than the path MTU for the connection. Microsoft Windows provides a mechanism by which segmentation of data packets may be performed after initial processing by the system protocol stack. The Windows network task offload architecture allows TCP/IP segmentation to be offloaded to a suitable network interface device (NIC) if its miniport driver indicates to the operating system (OS) that the network interface device is capable of TCP/IP segmentation offload. As in other operating systems, the NIC may further perform the TCP/IP checksum calculation in hardware if its driver indicates that capability to the OS.

With segmentation offload, TCP can pass a send buffer for transmission that is larger than the maximum segment size (MSS) supported by the end to end connection associated with the data of the send buffer. Typically the MSS will be the minimum MTU of all the network segments over which a particular network connection is carried—i.e. the path MTU. A network interface device capable of segmentation offload uses the headers of the send buffer (or "superpacket") to define headers and data segments of a size not greater than the MSS for transmission over a network.

The present invention may be implemented in the Windows network task offload architecture. In these embodiments, the device driver of the network interface device (or some element of the driver structure, such as a miniport driver) indicates to the operating system that the NIC is capable of performing TCP/IP segmentation. In fact, the NIC need not be capable of performing TCP/IP segmentation. The operating system will thus generate send buffers and attempt to pass these to the NIC by calling the necessary functions of its device driver. In accordance with the present invention, the device driver is operable to accept the send buffer and perform segmentation at the device driver rather than at the NIC, and subsequently pass the segmented data packets to the NIC for transmission over the network.

Figure 2:
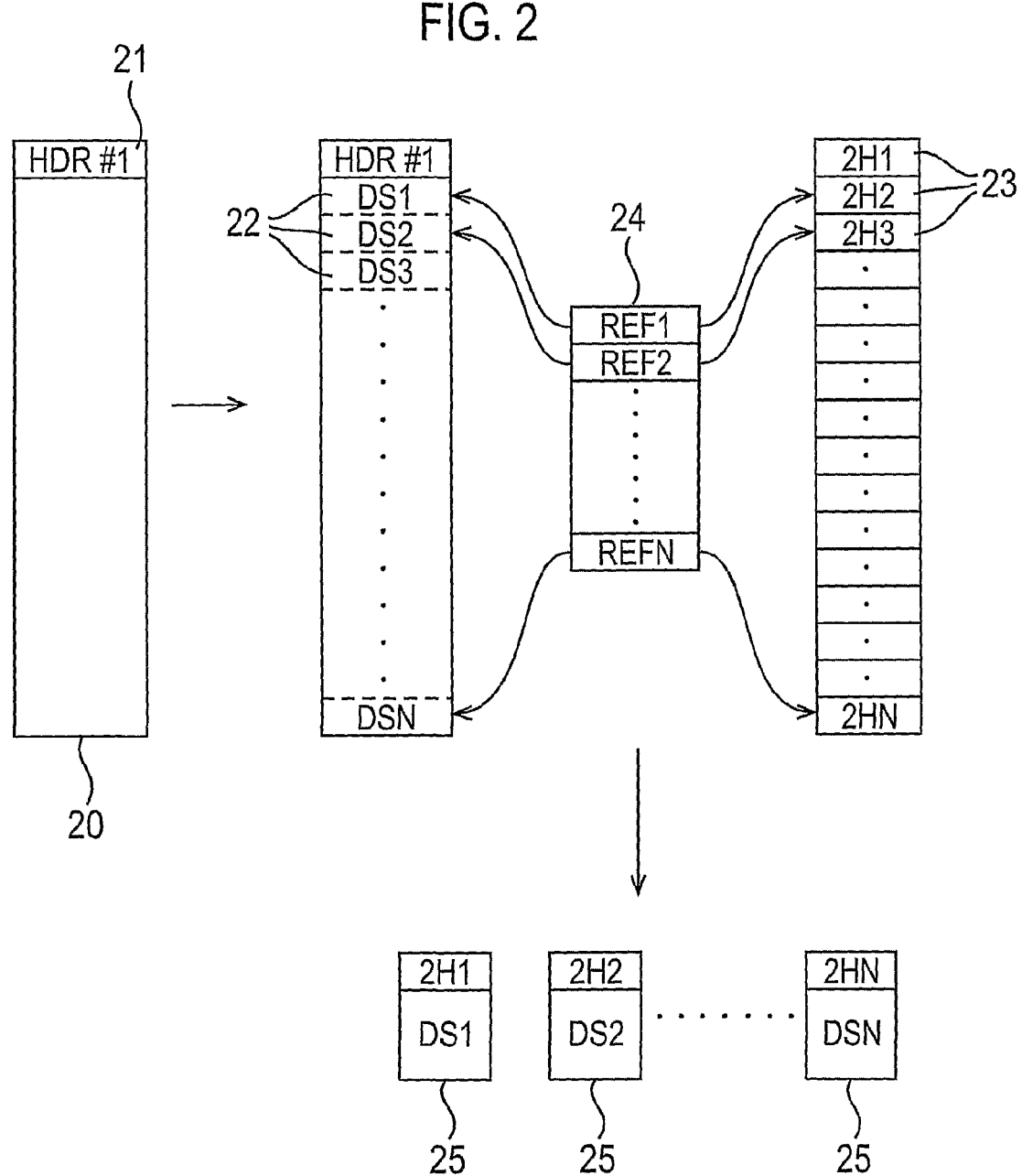
FIG. 2 shows a method for performing segmentation at a device driver in accordance with the present invention.

FIG. 2 illustrates a method for performing segmentation at a device driver in accordance with the present invention. Data packet (or send buffer) 20, is generated by a network protocol stack of the system. Generally data packet 20 is larger than the maximum segment size (MSS) that may be sent over the network (i.e. it is a "superpacket"). The data packet may be generated in accordance with the Windows segmentation offload architecture, or by any other protocol stack. Header 21 is generated by the protocol stack in accordance with the protocol by which the data is to be sent. Suitably this may be TCP/IP, and the header contains TCP and IP header information. However, other protocols may be substituted for TCP/IP, as is known in the art.

In order to transmit data packet 20, the protocol stack will call certain functions of the device driver. Typically, the device driver will accept the data packet for transmission on behalf of the NIC that it represents. The data packet may be copied to an area of memory accessible to the device driver or NIC, or more commonly a reference to the data packet or its location in memory may be passed to the device driver (in which case the device driver will be responsible for ensuring that the memory is accessible by the NIC for transmission—by calling OS routines which prevent the memory being swapped out and ensuring that the memory is visible over the IO bus and determining an address which the IO controller may use to access the memory). The device driver may accept the data packet before all of the data packet has been received. The data packet may be specified in fragments.

The device driver, or a functionality thereof, is capable of performing segmentation of the data packet in accordance with the protocols by which the data in the packet is to be sent. The device driver is preferably aware of the maximum transmission unit (MTU) of the network segment to which the host is connected. The driver may receive segmentation size information from the operating system or protocol stack with the data packet. This information may include the MSS for the data packet, i.e. the MSS of the relevant connection, and/or the path MTU for that connection. Preferably the device driver does not manipulate the data packet into a series of second data packets and store those packets whole in memory for transmission by the NIC. The device driver may be operable to start segmentation of data packet 20 before all of that data packet has been received.

In systems in which the operating system or protocol stack supports offload of IP segmentation, the device driver preferably advertises or indicates in some manner to the operating system or protocol stack that the NIC it represents is capable of segmentation offload. The operating system or protocol stack may then provide segmentation information with the superpacket it passes (in a manner as discussed above) to the device driver for transmission by the NIC. The segmentation information being intended to allow the NIC to perform IP segmentation of the superpacket into data packets each of which is not greater than the MSS. In accordance with the present invention, this IP segmentation is actually performed at the device driver. The segmentation information may include the MSS for the end-to-end connection and/or the Maximum Transmission Unit (MTU) for the path.

So as to minimise the number of data manipulation operations, the device driver logically divides the data carried by superpacket 20 into a series of data segments 22, each of which is not greater than the MSS size, including a header which is to be sent with the data segment. No actual division of the data packet need be performed, but sufficient information may be stored to allow the start and end of each data segment to be identified in data packet 20. This may be a set of pointers containing a reference to the start of each data segment. Alternatively, the first data segment in data packet 20 may be identified and each subsequent data segment in the packet may be inferred from the size of the data segments.

The device driver further forms a set of headers 23 for each of the data segments 22 into which data packet 20 is divided. The checksum for each header may be calculated by the device driver from each respective data segment. Alternatively, the checksum may be performed at the NIC, as is known in the art (the NIC could be capable of checksum offload in accordance with the Windows network task offload architecture). Preferably any options and flag values set in header 21 of data packet 20 are preserved in headers 23. Preferably headers 23 share the same packet identifier as header 21. Thus, TCP and IP flow control may be retained by the protocol stack, but with the processing demands of segmentation being handled by the device driver. Furthermore, only a single call to the device driver API is required to enqueue the superpacket and all the traffic data it carries at the IP layer, rather than the multiple calls required to enqueue the same traffic data were the data in packets each being below the MSS.

The device driver may be capable of calculating a byte offset for each header 23, indicating the position in bytes of its respective segment of data in data packet 20. Thus the set of headers 23 indicate the correct order of the data segments making up the data carried by data packet 20. Preferably the headers are stored in memory held privately by the device driver. Preferably this memory (or header pool) is permanently mapped and accessible to the NIC so as to allow the NIC to access new headers without the overhead cost of having to arrange for each new header or set of headers to be accessible to the NIC.

The device driver forms a specification 24, which may be of any suitable structure. The specification indicates the data segments 22 and their respective headers 23 which are to be transmitted by the NIC. The indications may be by way of pointers to the locations in memory in which the data segments and headers are held. There may be a pointer for each data segment/header pair or a single pointer to data packet 20 (or the start of the data it carries) and to the queue of headers 23 held in memory. There may be one or more specifications, each indicating a different subset of the header and data segment pairs for transmission.

Each data segment and its respective header together form a data packet 25 having a size which is not greater than the MSS for the connection over which the packet is to be sent (and as indicated by the segmentation information passed down by the operating system or protocol stack). There may be more than one data segment in a data packet 25. This may occur if, for example, the memory in which the data segments are stored is fragmented or crosses a physical page boundary. The set of data packets 25 together carry the data passed to the device driver in data packet 20 by the protocol stack. In order to send this set of data packets, or a sub-set of that set, a transmission request is sent to the network interface device. This request (or other commands sent to the NIC) may include the specification indicating the headers and data segments for transmission. Alternatively, a reference to that specification may be included. Passing a specification to the NIC allows many data packets to be enqueued for transmission with a single request or command.

Preferably the memory in which the headers are held is pre-mapped to the NIC. One or both of the specification and original data packet 20 may be stored in memory that is also pre-mapped. This allows the NIC to access the data for transmission by direct memory access (DMA).

FIG. 3 shows a method for performing packet reassembly at a device driver in accordance with the present invention. The device driver is arranged to accept data packets 30 from a network interface device. The NIC may be configured to write the data packets to an area of memory by DMA. The area of memory may be held privately by the device driver. The area of memory may be indicated to the NIC by the device driver. Typically the area of memory is allocated to the device driver by the operating system and is returned to the operating system upon delivering the data for protocol processing by, for example, an RX upcall. The area of memory will be returned to the free pool once the operating system has disposed of the data. In other cases, the area of memory will be returned to the operating system by freeing up that memory area—for example, if an error is detected in an incoming packet.

The device driver is arranged to enqueue each packet onto a queue defined in memory by the device driver. Preferably each queue relates to a different data flow and each data packet is enqueued at the queue corresponding to the data flow to which it belongs. There may be a plurality of queues. If the packets are TCP/IP data packets, these data flows are distinct TCP/IP data flows.

If a data packet relates to a data flow for which there is no queue, the device driver defines a new queue for that data flow in memory available to it. It then enqueues that packet on that queue as the first data packet 31 of that queue. When a predetermined number of queues have been defined in memory, the device driver may be configured to flush all queues in the manner described below.

Data packets 30 that relate to a data flow for which a queue has been defined are enqueued at the queue corresponding to that data flow. The header 35 of the first data packet 31 in the queue is modified so as to include all the newly-enqueued data packets. This may be effected by modifying an indication of packet size (such as a length in bytes) in header 35 to include the additional data carried by the newly enqueued data packets (i.e. the data segments only). Thus, as new packets are added to the queue, header 35 is modified to include the data carried by each new data packet. In this manner, modified header 36 of the first data packet becomes a header for all the data in the queue: a superpacket 34. The data segment of the superpacket does not include the headers of the second and subsequent data packets 32.

A specification 33 is defined by the device driver to indicate the data segments in the queue which are to form the data of superpacket 34. The specification may be a series of pointers indicating the locations in memory of the data segments of the enqueued data packets. However, the specification may be in any form that provides sufficient information to the protocol stack to access the data segments. From the protocol stack's point of view, the specification may be a data structure representing a receive buffer from which the protocol stack picks up new data for processing. Thus, defining the specification simply involves adjusting the pointers of this data structure to point to the first header and data segment in the queue but only the data segments of subsequent data packets in the queue.

When the data on a queue is to be passed up to the protocol stack, the protocol stack accesses the first header and data segment and only the data segments of subsequent packets in the queue. Since the first header has been modified so as to include all the data segments of subsequent packets, the first header and the data segments together comprise superpacket 34.

The queues may be flushed when one or more of a number of predetermined conditions are met. Flushing may preferably occur on a per-queue basis. Thus, when a particular queue reaches a predetermined length it may be flushed—that is, the data on the queue may be passed up to the protocol stack. This predetermined length may be a number of bytes or a number of packets. Some or all of the queues may be flushed when a packet is received out of sequence, when there is no data in a packet, or when one of the TCP flags RST, SYN or URG are set.

Preferably when no more data packets are being received at the NIC, or after a predetermined length of time has passed since the last packet was received, some or all of the queues may be flushed.

Preferably if one or more of the data packets accepted from the NIC are not checksummed, or are fragmented, then the data packets are delivered up to the protocol stack without being reassembled by the device driver. Furthermore, the one or more queues are preferably flushed and the superpackets defined by each queues and their respective specification are also delivered up to the protocol stack.

The reassembly of data packets in accordance with the present invention is seamless as far as the protocol stack is concerned: the stack may not be aware that the device driver is reassembling received data packets into superpackets. Preferably the superpackets are larger than maximum size of data packet that may be received over the network and the protocol stack is configured to accept data packets of such a size.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method comprising:
   performing segmentation of a first data packet stored in a first memory area into a plurality of second data packets, each second data packet comprising a header and a segment of data from the first data packet, at a functionality of a device driver for a network interface device supported by a data processing system, the network interface device being capable of supporting a communication link over a network with another network interface device, wherein performing the segmentation comprises:

accepting the first data packet, the first data packet carrying data for transmission by the network interface device over the network;

logically dividing said first data packet into segments of data of the accepted first packet to provide at least one pointer to a data segment in said first memory area;

forming a set of headers for the plurality of second data packets from the accepted first data packet;

writing the formed set of headers to a second memory area;

forming a specification, the specification indicating the formed set of headers written in memory and the segments of data in the accepted first data packet, the specification comprising said at least one pointer to the first memory area for the data segments and at least one pointer to the second memory area for the headers; and requesting by means of the device driver transmission by the network interface device of the headers in the second memory area and the respective segments of data in the first memory area indicated in the specification so as to effect transmission of the second data packets over the network; said request comprising an indication of said specification.

2. A method as claimed in claim 1, wherein the device driver is operable to indicate to the data processing system that the network interface device is capable of performing transmit segmentation.

3. A method as claimed in claim 2, wherein the network interface is not capable of performing transmit segmentation.

4. A method as claimed in claim 1, wherein the device driver is operable to indicate to the data processing system that the network interface device is capable of performing a checksum calculation on each segment of data.

5. A method as claimed in claim 1, wherein TCP flow control is performed at a network protocol stack of the data processing system.

6. A method as claimed in claim 1, wherein the size of the first data packet is greater than the maximum packet size allowed by the network segment to which the data processing system is connected.

7. A method as claimed in claim 1, wherein the maximum size of the second packets is indicated to the device driver by the data processing system.

8. A method as claimed in claim 1, wherein the maximum size of the second packets is indicated to the device driver in a header of the first data packet.

9. A method as claimed in claim 1, wherein the size of each of the plurality of second data packets is not greater than the maximum packet size allowed by the network segment to which the data processing system is connected.

10. A method as claimed in claim 1, wherein the size of each of the plurality of second data packets is not greater than the maximum packet size allowed over the connection over which those packets are to be sent.

11. A method as claimed in claim 1, wherein the formed set of headers is written to a first area of the memory.

12. A method as claimed in claim 11, wherein the step of accepting the first data packet includes the step of receiving the first data packet at a second area of the memory.

13. A method as claimed in claim 12, wherein the second area of the memory is allocated to the device driver.

14. A method as claimed in claim 12, wherein the first data packet is received in fragments and the fragments are enqueued at the second area of the memory.

15. A method as claimed in claim 14, wherein segmentation of the first data packet starts before all the fragments of the first data packet have been received.

16. A method as claimed in claim 12, wherein the network interface device is operable to access the first and second areas of the memory by Direct Memory Access.

17. A method as claimed in claim 11, wherein the first area of the memory is allocated to the device driver.

18. A method as claimed in claim 1, wherein the step of requesting transmission of the headers and the respective segments of data indicated in the specification is by means of a single request to the network interface device.

19. A method as claimed in claim 1, wherein the header of the first data packet includes a first identifier and all the headers of the second data packets include the first identifier.

20. A method as claimed in claim 1, wherein the step of forming a set of headers for the plurality of second data packets includes the step of calculating an offset for each header in the set, the offset of a header being the position in bytes of its respective segment of data in the first data packet.

21. A method as claimed in claim 1, wherein the step of forming a set of headers for the plurality of second data packets includes the step of calculating a checksum for each header in the set, the checksum of a header being calculated using its respective segment of data.

22. A data processing system having access to a memory and a network interface device capable of supporting a communication link over a network with another network interface device, the data processing system comprising:

an operating system;

a device driver of the network interface device;

at least one application operable to request that data for transmission is sent over the network, said first data packet stored in a first memory area;

a functionality of the operating system configured to, in response to a request by an application to send data for transmission over the network, form the data for transmission into at least one first data packet at a network protocol stack of the data processing system and send in indication to the device driver that the at least one first data packet is to be transmitted over the network; and a functionality of the device driver configured to perform segmentation of each first data packet into a plurality of second data packets, each second data packet comprising a header and a segment of data, the device driver performing segmentation by:

logically dividing said first data packet into segments of data of the accepted first packet to provide at least one pointer to a data segment in said first memory area;

forming a set of headers for the plurality of second data packets from the first data packet;

writing the formed set of headers to a second memory area;

forming a specification indicating the formed set of headers written in the memory and the segments of data in the first data packet, the specification comprising said at least one pointer to the first memory area for the data segments and at least one pointer to the second memory area for the headers; and requesting transmission by the network interface device of the headers in the second memory area and the respective segments of data in the first memory area indicated in the specification so as to effect transmission of the second data packets over the network; said a request comprising an indication of said specification.

* * * * *